(12) United States Patent
Saitoh et al.

(10) Patent No.: US 6,655,219 B2
(45) Date of Patent: Dec. 2, 2003

(54) LOAD CELL AND ROLL-OVER ALARMING DEVICE FOR A CRANE

(75) Inventors: Fumihiro Saitoh, Narutoh-machi (JP); Motoyasu Uenohara, Sakura (JP); Masaji Kobayashi, Narashino (JP)

(73) Assignee: Furukawa Co., Ltd. (JP)

( * ) Notice: Subject to any disclaimer, the term of this patent is extended or adjusted under 35 U.S.C. 154(b) by 173 days.

(21) Appl. No.: 09/915,822

(22) Filed: Jul. 26, 2001

(65) Prior Publication Data

US 2002/0020231 A1 Feb. 21, 2002

(30) Foreign Application Priority Data

Jul. 27, 2000 (JP) ........................................ 2000-226337

(51) Int. Cl.$^7$ ................................ G01N 3/00; G01F 1/38
(52) U.S. Cl. ....................................... 73/795; 73/861.47
(58) Field of Search ............................... 73/795, 861.47, 73/862.49, 862.542, 862.29, 708, 720, 573, 141 A, 862.56, 37; 212/278, 276, 270, 347; 439/310, 752; 470/96, 103; 271/10.13; 114/125; 104/131; 280/765.1

(56) References Cited

U.S. PATENT DOCUMENTS 3,771,667 A * 11/1973 Becker et al. ............. 211/39 R
4,037,469 A * 7/1977 Nordstrom et al. ....... 73/141 A
4,385,525 A * 5/1983 Phillips et al. ............. 73/720

FOREIGN PATENT DOCUMENTS

JP        11011880 A    1/1999

* cited by examiner

Primary Examiner—Edward Lefkowitz
Assistant Examiner—Octavia Davis
(74) Attorney, Agent, or Firm—Young & Basile, P.C.

(57) ABSTRACT

To detect a low load of an outrigger with high accuracy and improve alarming accuracy of a roll-over alarming device, the roll-over alarming device for a crane includes a load cell 1 having a coil spring 5 provided with a strain gauge 4, and an upper load cell case 6 and a lower load cell case 7 which support the coil spring 5 from its top and bottom to transfer a load of an outrigger to the coil spring 5, supports 8, 9 for supporting a load when the load having more than a predetermined value acts to restrain yielding of the coil spring 5 being provided between the upper load cell case 6 and the lower load cell case 7, and an alarming section which issues a roll-over alarm on the basis of a load detecting value of the outrigger from the load cell 1.

6 Claims, 15 Drawing Sheets

F I G. 1
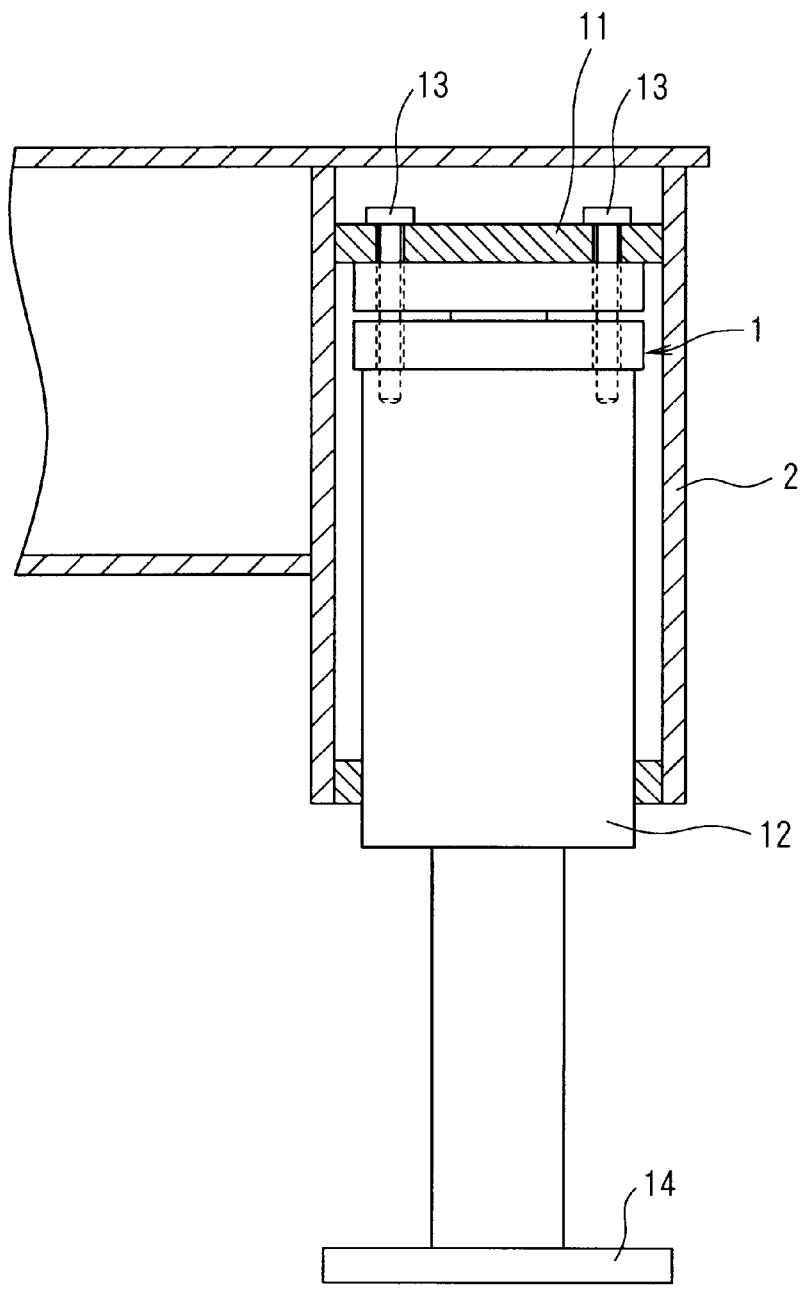

LOAD CELL AND ROLL-OVER ALARMING DEVICE FOR A CRANE

BACKGROUND OF THE INVENTION

1. Field of the Invention

The present invention relates to a roll-over alarming device for a crane using a load cell which can endure a maximum load of an outrigger of a crane and measure a low load with high accuracy.

2. Description of the Related Art

A vehicle-mounted crane which is a crane mounted on a vehicle is generally provided with an outrigger, and is adapted to extend the outrigger to be grounded for ensuring stability at the time of a crane operation. However, when a lifted load or operating radius becomes excessive, there is a possibility that the crane loses its balance and rolls over.

Thus, for preventing such a roll-over accident, a roll-over preventing device for a crane has been used which always detects a grounding load of an outrigger in operation and determines a floating condition of the outrigger to issue an alarm when a detected load reaches below a predetermined value (in general, optionally set in a range of 0 to 3000 N).

Conventionally used means for detecting the grounding load of the outrigger of the roll-over preventing device for the crane includes means for detecting an inner pressure of an outrigger cylinder or means for detecting the grounding load using a load cell.

However, the means for detecting the inner pressure of the outrigger cylinder has high frictional resistance of packing of the outrigger cylinder with doubtful accuracy of a detected value and is not fit for use.

The means for detecting the grounding load using the load cell has high detection accuracy when detecting a high load as in the case where the outrigger is in a maximum load condition, but has low detection accuracy when detecting an extremely low load as in the case where a floating condition of the outrigger is detected.

That is, a generally used load cell is selected depending on a value of a maximum measuring load, but a limit load (load capacity) of the load cell is typically on the order of 1.5 times the maximum measuring load. Generally, in the case of load detecting of the outrigger, a maximum load is on the order of 90000 N, thus the load cell with the limit load on the order of 135000 N must be used.

However, as shown in FIG. 20, when the loads of 0 to 3000N are measured by the load cell with the limit load on the order of 135000 N, an output value of the load cell is on the order of 2% of a maximum output value, which is a minute output. Thus, accurate load detection is difficult in view of a measuring error or the like of the load cell itself.

SUMMARY OF THE INVENTION

The present invention is directed to solve the above problems in a roll-over alarming device for a crane and has its object to provide a load cell which can endure a maximum load of an outrigger of a crane and detect a low load with high accuracy and a roll-over alarming device with the load cell.

The load cell used for the present invention includes a coil spring provided with a strain gauge, and an upper load cell case and lower load cell case which support the coil spring from its top and bottom to transfer a load of an outrigger to the coil spring, wherein supports, which support the load to restrain yielding of the coil spring when the load having more than a predetermined value acts, are provided between the upper load cell case and lower load cell case.

The load cell has the supports, which support the load as substitutes for the coil spring when the load of an outrigger reaches more than the predetermined value, and thereby has a large load capacity, so that the load cell with a small maximum measuring load may be selected, which provides high detection accuracy of a low load at a low cost.

A roll-over alarming device for a crane according to the present invention, wherein the load cell is mounted on the outrigger of the crane so as to issue a roll-over alarm on the basis of a load detecting value of the load cell, can be manufactured at a low cost and issue a roll-over alarm with high accuracy, thereby improving safety.

The load cell is provided in an outrigger cylinder of a crane so as to vertically move a predetermined distance, and the upper load cell case is mounted on an outer box of the outrigger with a pin, which facilitates mounting of the load cell.

The load cell is configured in a float shape, and the upper load cell case is mounted on an outrigger cylinder with a pin, thus the load cell may be mounted as a substitute for a conventional float, which further facilitates mounting of the load cell.

The roll-over alarming device for a crane, wherein the load cell is configured in such a manner that the load cell integral with an alarming section can be disposed under a float of the outrigger, and the roll-over alarm is issued on the basis of a load detecting value of the load cell, may be disposed under the outrigger cylinder before a start of a crane operation and housed in a housing place when the crane operation is finished, and is not incorporated in the outrigger itself, and thereby can be applied to all the cranes with general versatility.

The load cell and alarming section of the roll-over alarming device can be separately disposed, a radio transmitter for transmitting a load detecting signal is provided on the load cell side, and a radio receiver for receiving a load detecting signal is provided on the alarming section side, thus an operator can recognize the roll-over alarm more reliably in a crane which is operated by the operator apart from an outrigger.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 1 is a front elevational view of a load cell of an embodiment of the present invention in a condition where it is mounted on an outrigger of a crane;

DESCRIPTION OF THE PREFERRED EMBODIMENT

Figure 2:
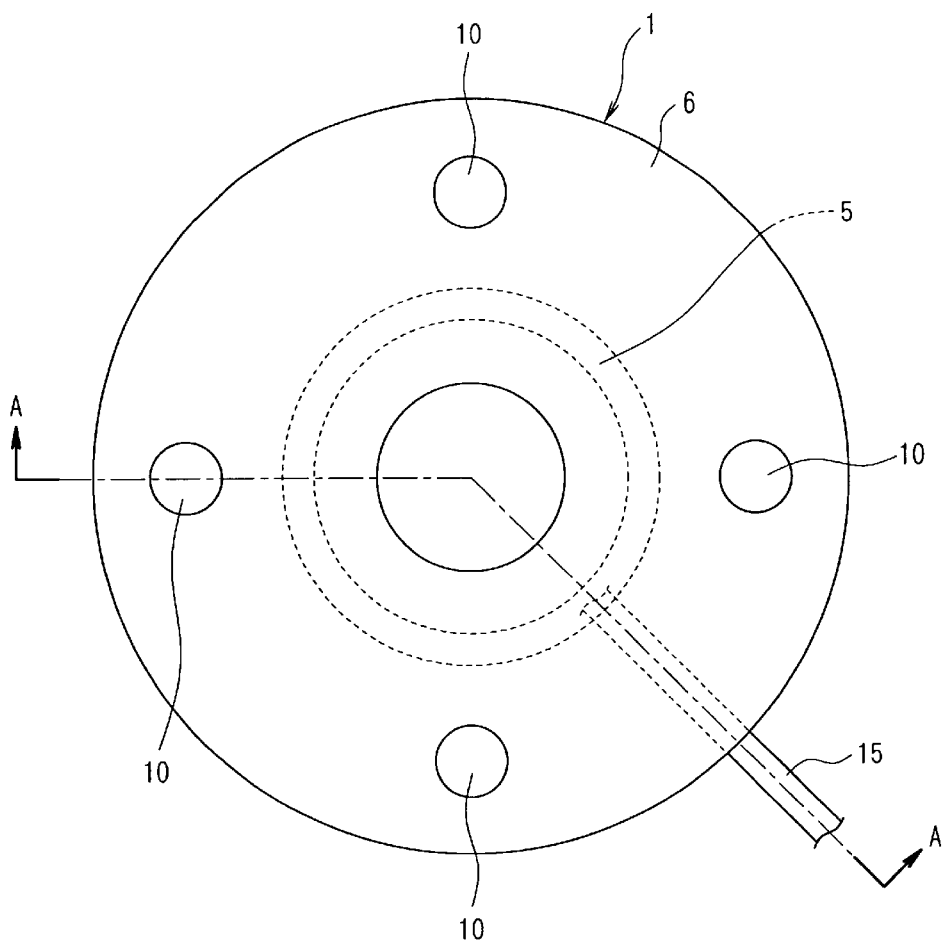
FIG. 2 is a plan view of the load cell.
Figure 3:
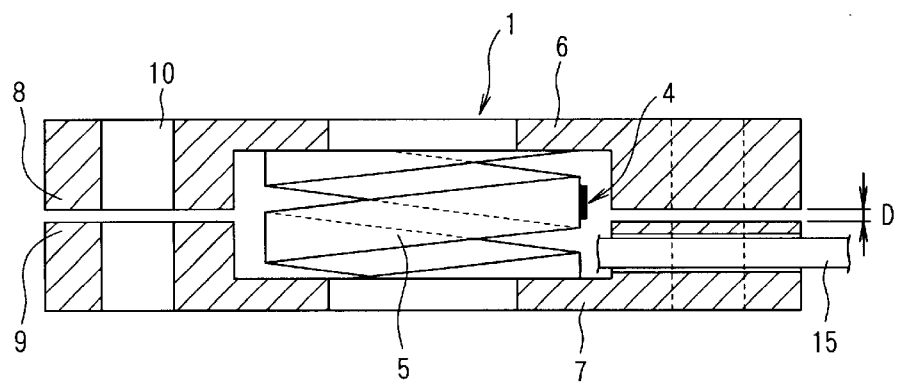
FIG. 3 is a sectional view on a line A—A in FIG. 2.
Figure 4:
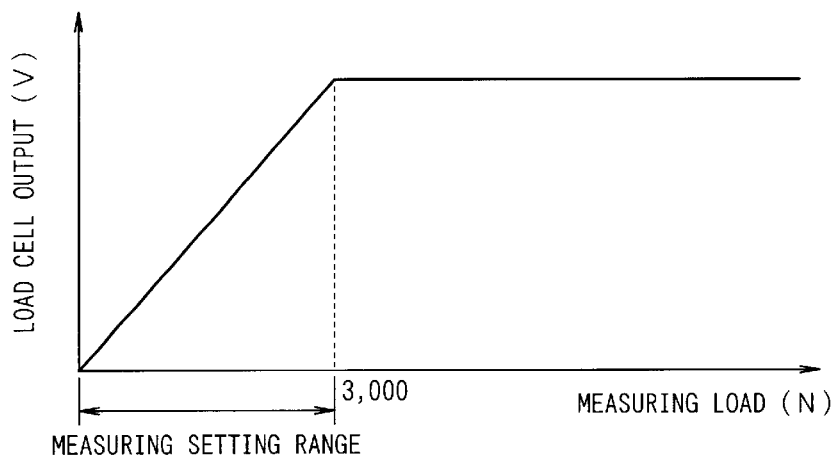
FIG. 4 is a graphical representation of a load measuring range of the load cell.

FIG. 1 is a front elevational view of a load cell of an embodiment of the present invention in a condition where it is mounted on an outrigger of a crane, FIG. 2 is a plan view of the load cell, FIG. 3 is a sectional view on the line A—A in FIG. 2, and FIG. 4 is a graphical representation of a load measuring range of the load cell.

A load cell 1 is interposed between a top end of an outrigger cylinder 12 and a top plate 11 to which the outrigger cylinder 12 is mounted, at an outer end of an outrigger 2 of a vehicle-mounted crane, and is mounted in a suspended manner from the top plate 11 together with the outrigger cylinder 12 by bolts 13.

Thus, the load cell 1 takes a load which acts on the outrigger 2 when the outrigger cylinder 12 is extended to ground a float 14 at the bottom end, so that the load of the outrigger 2 can be detected.

The load cell 1 comprises a coil spring 5 to which a strain gauge 4 is attached, and an upper load cell case 6 and a lower load cell case 7 which support the coil spring 5 from its top and bottom to transfer the load of the outrigger 2 to the coil spring 5. The upper load cell case 6 and the lower load cell case 7 are in disk shapes and formed with supports 8, 9, respectively on their peripheral edges so as to surround the coil spring 5 supported from its top and bottom in the center. The peripheral edges are drilled to be provided with bolt holes 10 in which bolts 13 are inserted. The supports 8, 9 are integrally formed with the upper load cell case 6 and the lower load cell case 7, respectively, but may be formed on either of them, or may be provided separately from the upper load cell case 6 and the lower load cell case 7.

The heights of the support 8 on the upper load cell case 6 side and the support 9 on the lower load cell case 7 side are set so as to generate a predetermined clearance D therebetween when the coil spring 5 is of a free length. When the load of the outrigger 2 acts on the coil spring 5 via the upper load cell case 6 and the lower load cell case 7, the coil spring 5 is compressed and gradually yields, but when a predetermined load acts, the supports 8, 9 abut against each other to support the load and restrain yielding of the coil spring 5. Therefore, an output of the load cell 1 is, as shown in FIG. 4, linearly increased until the load reaches the predetermined value (3000 N), and even when the load having more than the predetermined value acts, the output is not increased any longer and becomes constant.

A measuring range where the load is linearly increased is set to 0 to 3000 N here, but can be optionally set by changing a spring constant of the coil spring 5 and the clearance D.

The output of the load cell 1 is sent to an alarm section (not shown) via a cable 15. When the crane comes to be in danger of roll-over, the load of the outrigger 2 opposite the roll-over direction is reduced to the value around 0 N. Then, the alarm section issues a roll-over alarm on the basis of a load detecting value of the outrigger 2 from the load cell 1. For the alarm, optional means such as an audible alarm, alarm lamp, indication of alarm on a display, alarm message or the like with voice can be used independently or in combination.

The load detecting value from the load cell 1 can be linearly output in a range of 0 to 3000 N, therefore by determining a warning condition where care is required in operation though not immediately reaching the roll-over and an urgent dangerous condition where the roll-over is about to occur to issue warnings in a plurality of steps, safety operation can be accomplished so as to prevent roll-over accidents.

When the load having more than the predetermined value acts, the supports 8, 9 abut against each other to support the load, so that the load cell 1 can endure a maximum load of the outrigger 2, and the load cell 1 which has a small maximum measuring load can be used, thus a low load can be detected with high accuracy.

As a specific system configuration, for example, the load cell 1 has a first switch and a second switch. When the outrigger cylinder 12 is extended to ground the float 14 and the load acting on the outrigger 2 reaches 3000 N, the first switch is turned on for self-holding a power to the alarm section to sound an audible alarm which informs of the matter for five seconds. The first switch is provided in the load cell 1 so as to mechanically detect, for example, when the clearance D between the support 8 on the upper load cell case 6 side and the support 9 on the lower load cell case 7 side reaches zero.

During the crane operation, the alarm section issues alarms by sounding an intermittent sound when the load of the outrigger 2 reaches below 1500 N, and by sounding a continuous sound when below 500 N.

When the crane operation is finished and the outrigger cylinder 12 is shortened in order to house the outrigger 2, the load of the outrigger 2 reaches 0 N to sound the continuous sound. In this case, the second switch for breaking a self-holding circuit of the power can be manually turned off or turned off after, for example, ten second sound using a timer or the like.

Figure 5:
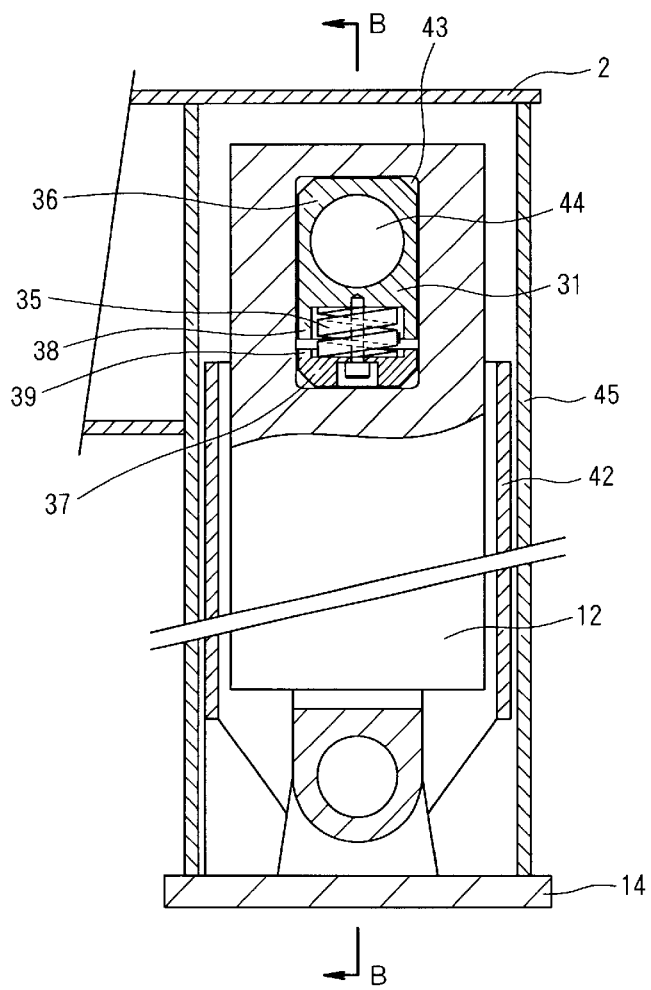
FIG. 5 is an elevational view of a load cell of another embodiment of the present invention in a condition where it is mounted on an outrigger of a crane.
Figure 6:
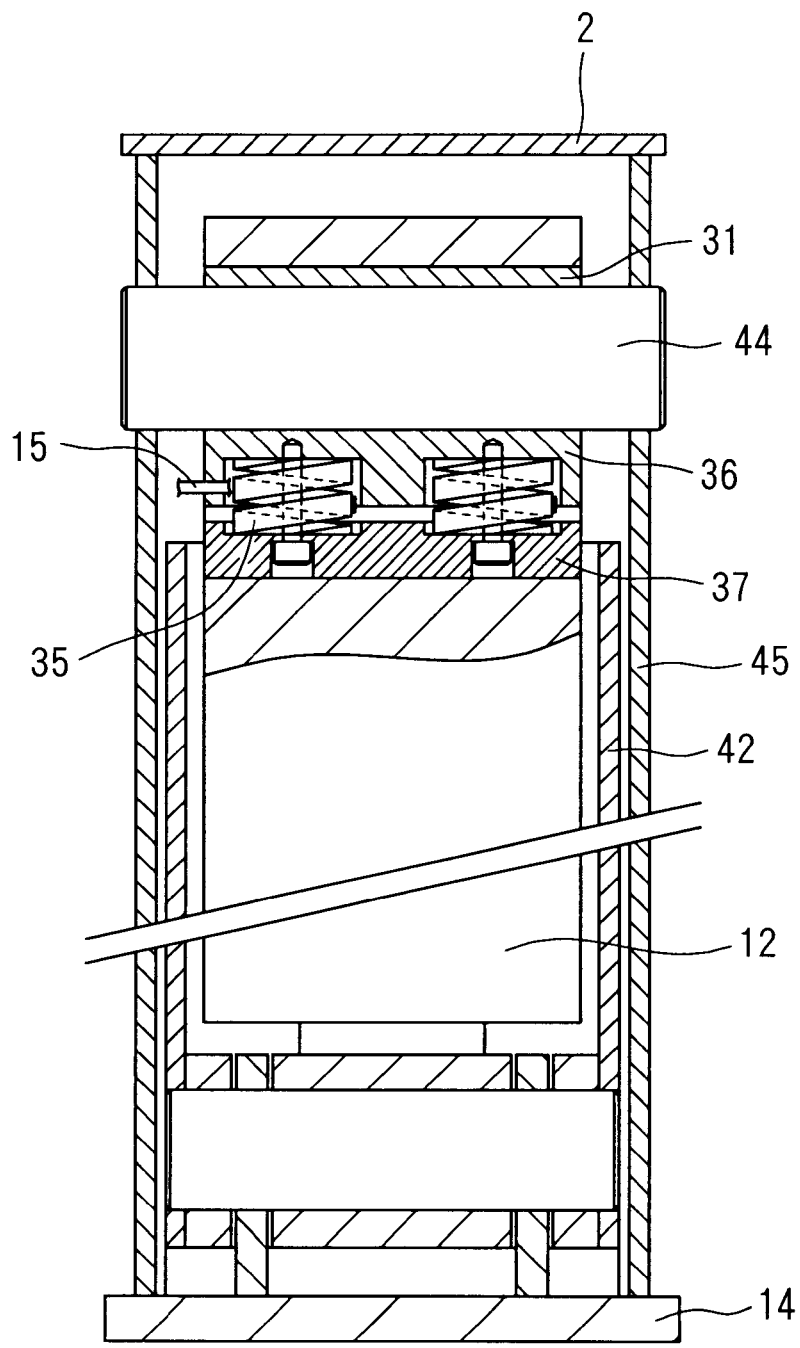
FIG. 6 is a sectional view on line B—B in FIG. 5.
Figure 7:
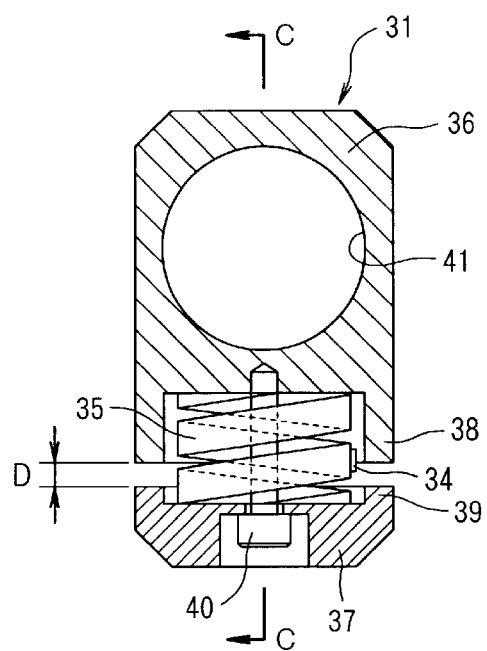
FIG. 7 is an enlarged view of a load cell portion in FIG. 5.
Figure 8:
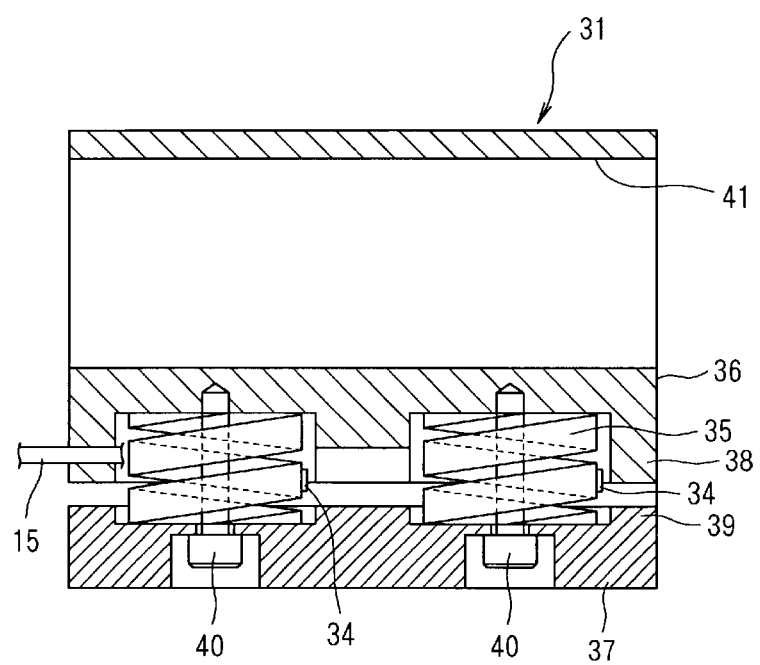
FIG. 8 is a sectional view on line C—C in FIG. 7.
Figure 9:
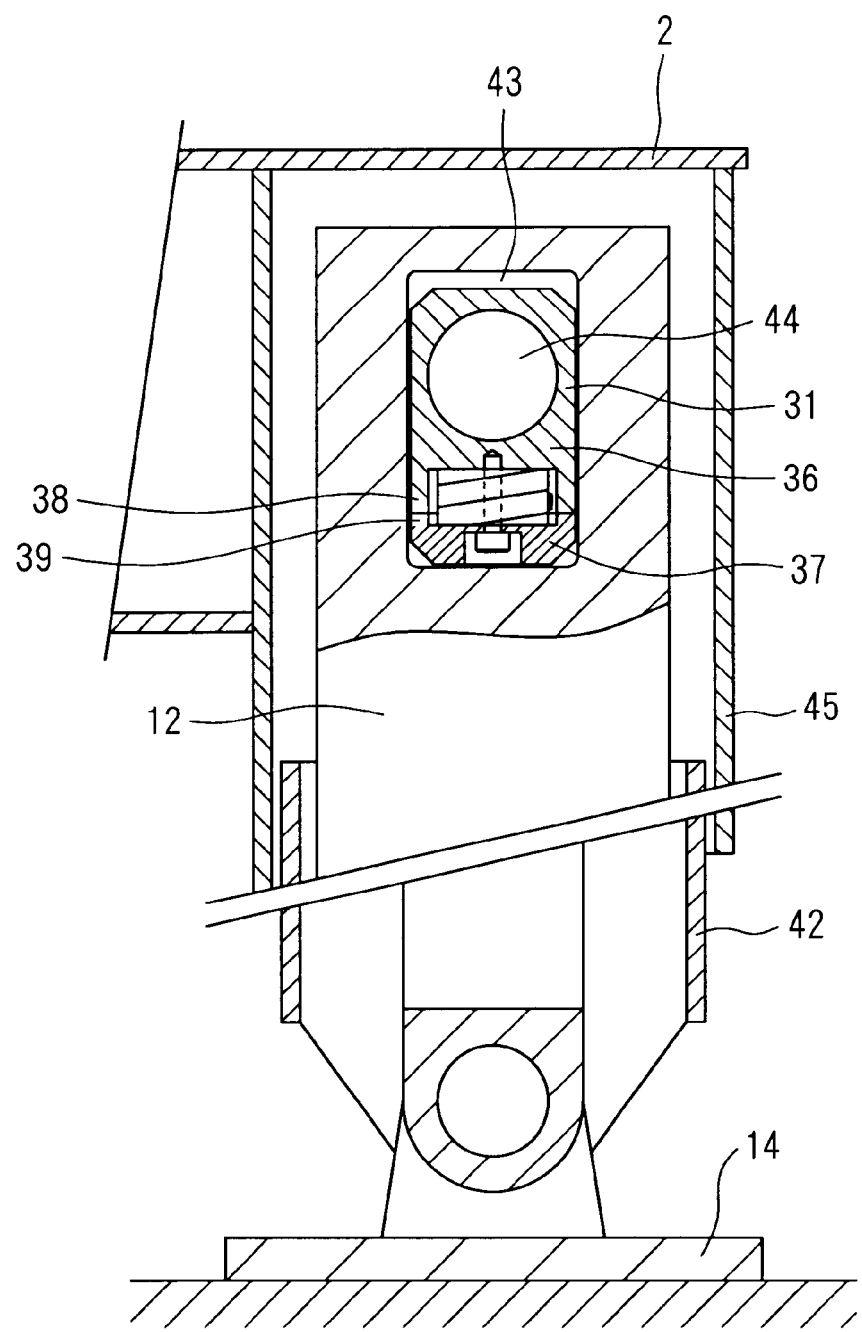
FIG. 9 is an elevational view of a load cell in a condition where a float of the outrigger is grounded and a load acts on the load cell to cause yielding of a coil spring.
Figure 10:
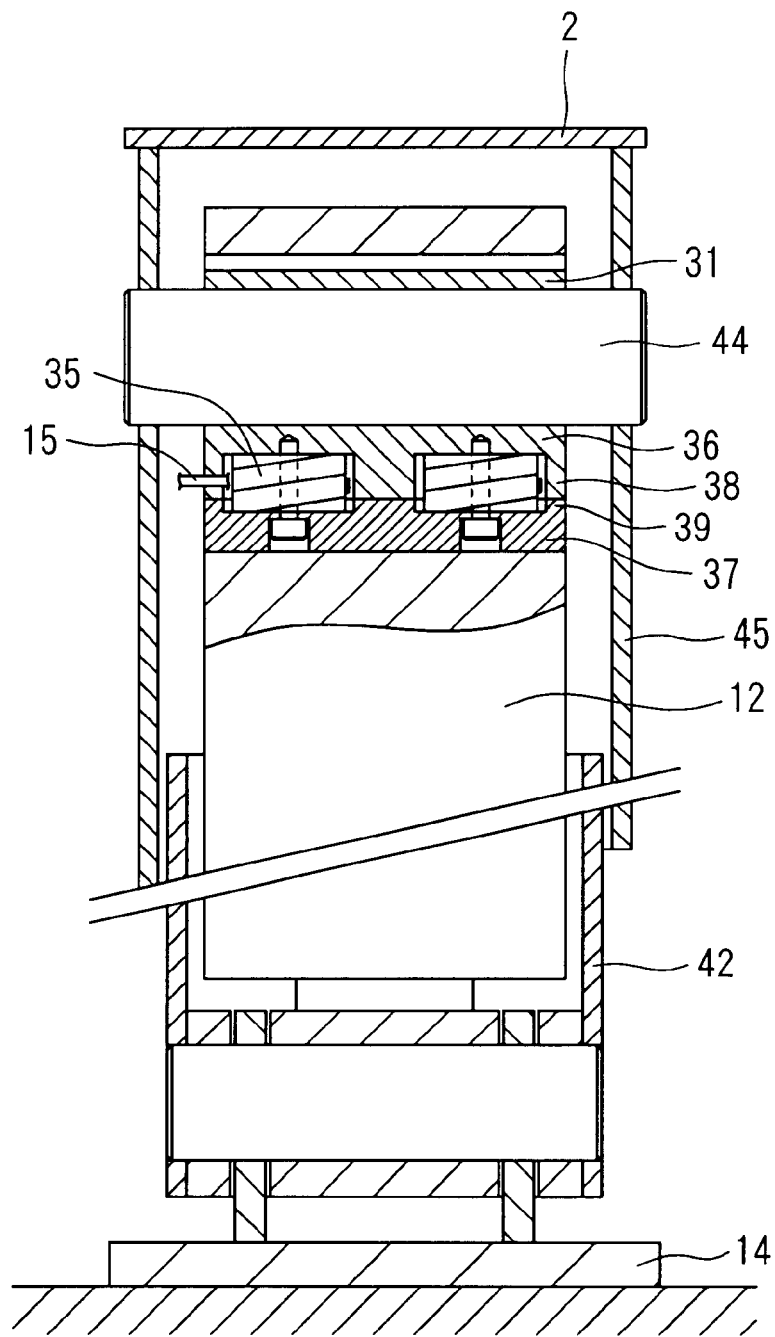
FIG. 10 is an elevational view of a load cell in a condition where the float of the outrigger is grounded and the load acts on the load cell to cause the yielding of the coil spring.

FIG. 5 is a elevational view of a load cell of another embodiment of the present invention in a condition where it is mounted on an outrigger of a crane, FIG. 6 is a sectional view on line B—B in FIG. 5, FIG. 7 is an enlarged view of a load cell portion in FIG. 5, FIG. 8 is a sectional view on line C—C in FIG. 7, and FIGS. 9 and 10 are elevational views of a load cell in a condition where a float of the outrigger is grounded and a load acts on the load cell to cause yielding of a coil spring.

The load cell 31 has a basic configuration identical to that of the load cell 1 in FIG. 3, and comprises a coil spring 35 to which a strain gauge 34 is attached, and an upper load cell case 36 and the lower load cell case 37 which support the coil spring 35 from its top and bottom to transfer the load of the outrigger 2 to the coil spring 35.

The upper load cell case 36 and the lower load cell case 37 are in rectangular parallelepiped shapes, provided with two coil springs 35 at the front and back, and formed with supports 38, 39, respectively so as to surround the coil springs 35. The number of the coil springs 35 can be appropriately selected depending on a maximum load to be measured.

The upper load cell case 36 and the lower load cell case 37 are set so as to generate a predetermined clearance D between the supports 38, 39 when the coil springs 35 are of free lengths and connected by connection bolts 40, and the lower load cell case 37 is adapted to freely move relative to the connection bolt 40 in a yielding direction of the coil spring 35. An upper portion of the upper load cell case 36 is drilled to be provided with a pin hole 41 for mounting.

The load cell 31 is incorporated in a load cell room 43 provided in an upper portion of an outrigger cylinder 12 embedded in an inner box 42 of the outrigger 2 so as to vertically move a predetermined distance, and is mounted on an outer box 45 of the outrigger 2 by inserting a pin 44 in the pin hole 41 of the upper load cell case 36.

Therefore, the outrigger cylinder 12 is in a suspended condition from the pin 44 via the upper load cell case 36 when shortened as shown in FIG. 5, and the coil springs 35 are of free lengths to generate the clearance between the supports 38, 39.

When the outrigger cylinder 12 is extended to ground the float 14 at the bottom end, the load cell 31 takes a load which acts on the outrigger 2 and the coil springs 35 are compressed and yield, so that the load of the outrigger 2 can be detected. When a predetermined load acts, the supports 38, 39 abut against each other to support the load and restrain yielding of the coil springs 35 as shown in FIG. 9.

The output of the load cell 31 is sent to an alarm section (not shown) via a cable 15, and the alarm section issues a roll-over alarm on the basis of a load detecting value of the outrigger 2 from the load cell 31.

The load cell 31 is previously incorporated in the load cell room 43 of the outrigger cylinder 12 and can be mounted simply by inserting the pin 44 in the pin hole 41 from the outside of the outer box 45 of the outrigger 2, so that mounting is easier than in the case of interposing the load cell between the outrigger cylinder 12 and top plate 11 as shown in FIG. 1.

Figure 11:
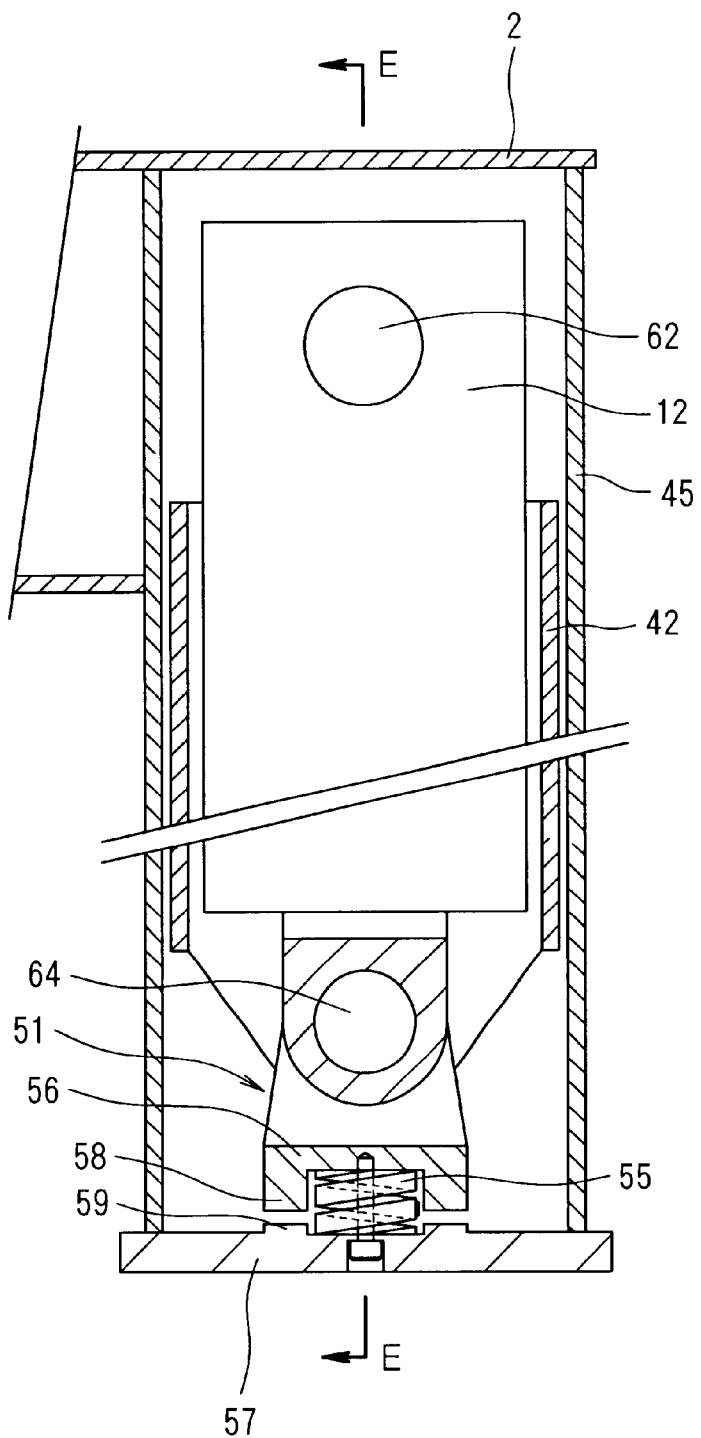
FIG. 11 is an elevational view of a load cell of still another embodiment of the present invention in a condition where it is mounted on an outrigger of a crane.
Figure 12:
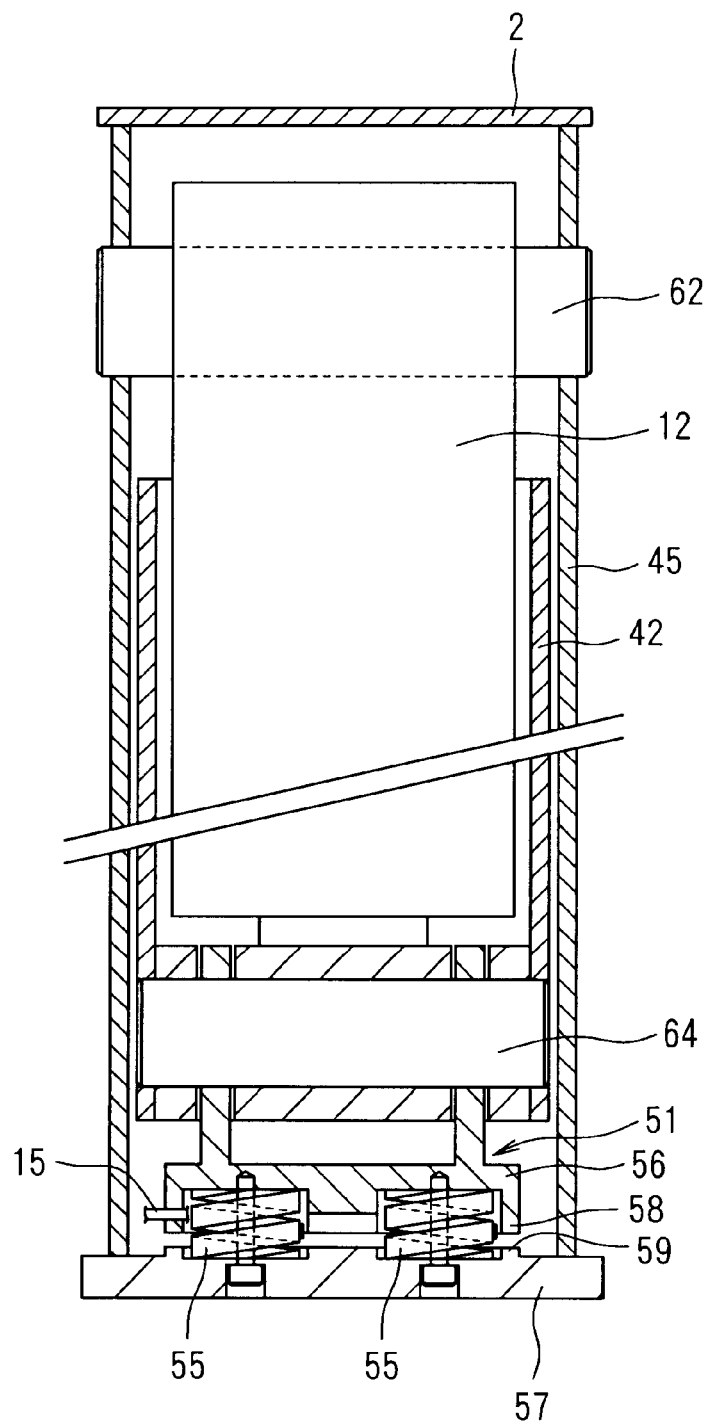
FIG. 12 is a sectional view on line E—E in FIG. 11.
Figure 13:
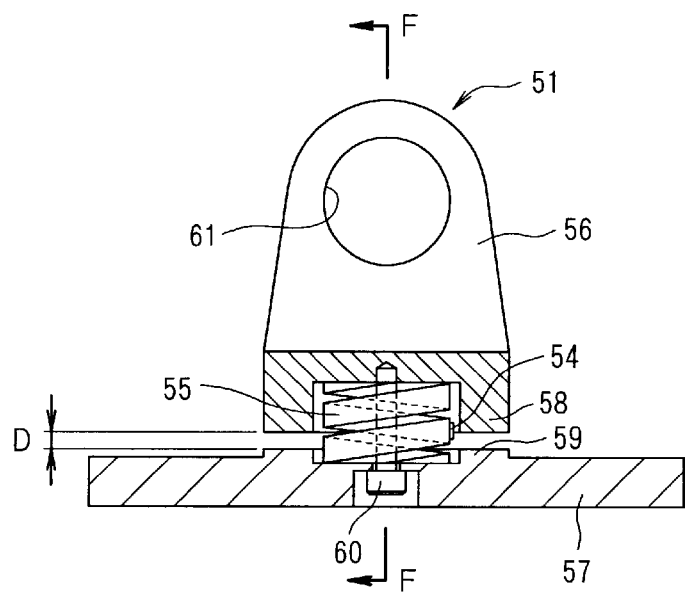
FIG. 13 is an enlarged view of a load cell portion in FIG. 11.
Figure 14:
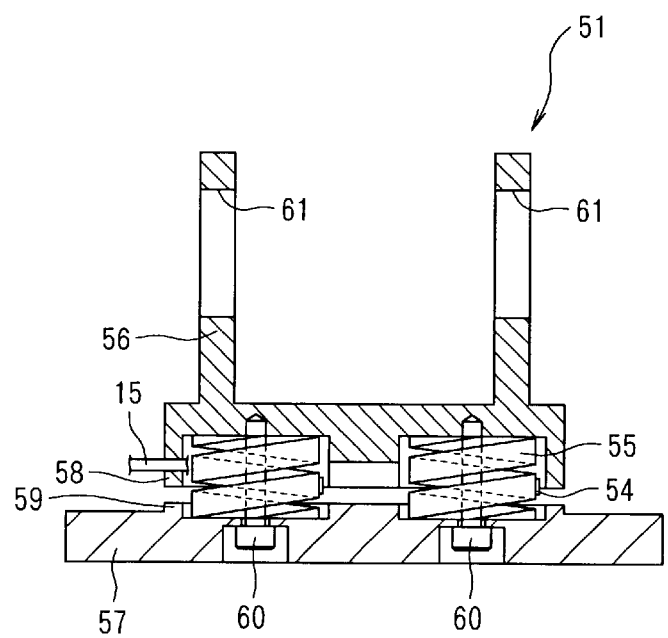
FIG. 14 is a sectional view on line F—F in FIG. 13.
Figure 15:
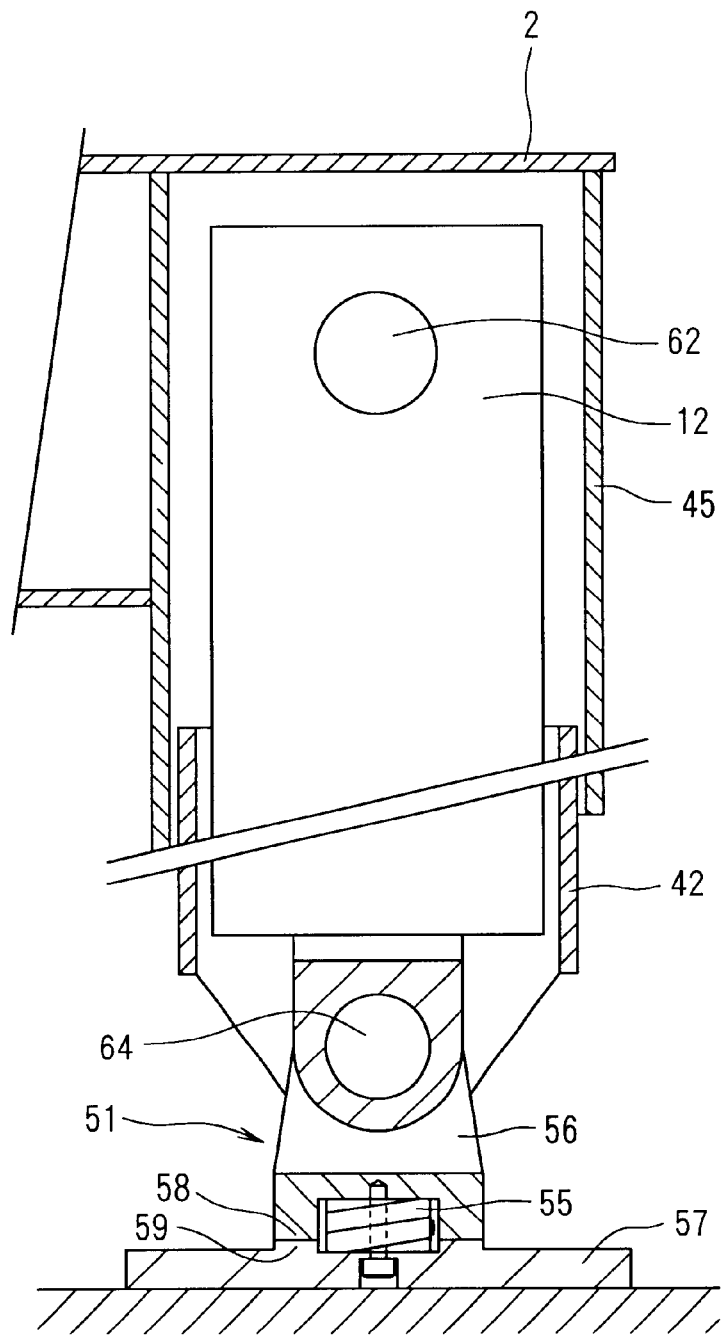
FIG. 15 is an elevational view of a load cell in a condition where a float of the outrigger is grounded and a load acts on the load cell to cause yielding of a coil spring.
Figure 16:
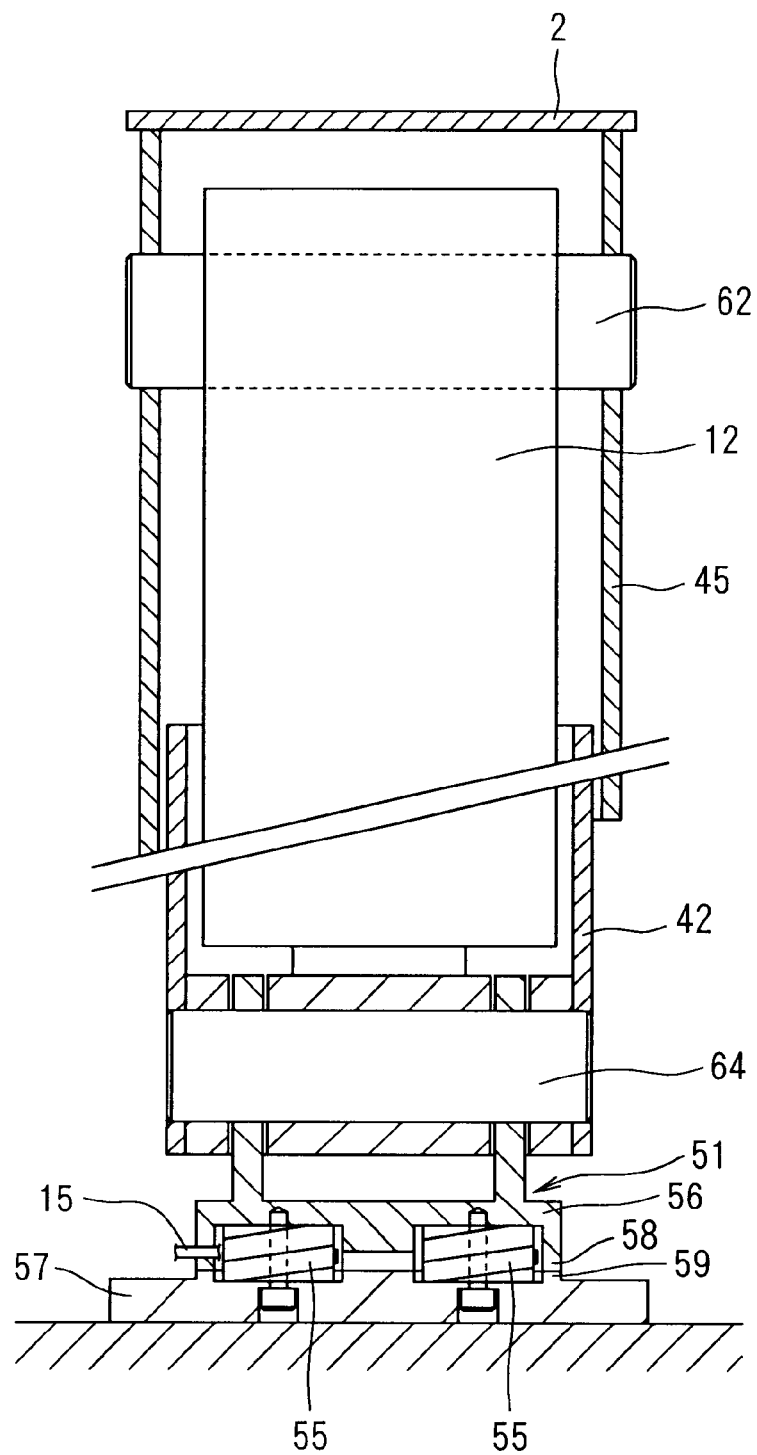
FIG. 16 is an elevational view of a load cell in a condition where the float of the outrigger is grounded and the load acts on the load cell to cause yielding of the coil spring.

FIG. 11 is an elevational view of a load cell of a still another embodiment of the present invention in a condition where it is mounted on an outrigger of a crane, FIG. 12 is a sectional view on line E—E in FIG. 11, FIG. 13 is an enlarged view of a load cell portion in FIG. 11, FIG. 14 is a sectional view on line F—F in FIG. 13, FIGS. 15 and 16 are elevational views of a load cell in a condition where a float of the outrigger is grounded and a load acts on the load cell to cause yielding of a coil spring.

The load cell 51 also has a basic configuration identical to that of the load cell 1 in FIG. 3, and comprises a coil spring 55 to which a strain gauge 54 is attached, and an upper load cell case 56 and lower load cell case 57 which support the coil spring 55 from its top and bottom to transfer the load of the outrigger 2 to the coil spring 55.

The load cell 51 has a contour in a float shape, and is provided with two coil springs 55 at the front and back between the upper load cell case 56 and lower load cell case 57, and formed with the supports 58, 59, respectively so as to surround the coil springs 55.

The upper load cell case 56 and the lower load cell case 57 are set so as to generate a predetermined clearance D between the supports 58, 59 when the coil springs 55 are of free lengths and connected by connection bolts 60, and the lower load cell case 57 is adapted to freely move relative to the connection bolt 60 in a yielding direction of the coil spring 55. An upper portion of the upper load cell case 56 is drilled to be provided with a pin hole 61 for mounting.

An outrigger cylinder 12 embedded in an inner box 42 of the outrigger 2 is mounted, at its upper portion, on an outer box 45 of the outrigger 2 via a pin 62. The load cell 51 is mounted on a bottom end of the outrigger cylinder 12 by inserting the pin 64 in the pin hole 61 of the upper load cell case 56 and is adapted to also act as a float.

Therefore, the load cell 51 is in a suspended condition from the pin 64 as shown in FIG. 11 at the time of shortening the outrigger cylinder 12, and the coil springs 55 are of free lengths to generate the clearance between the supports 58, 59.

When the outrigger cylinder 12 is extended, the load cell 51 is grounded as the float and takes a load which acts on the outrigger 2. The coil springs 55 are thereby compressed and yield, so that the load of the outrigger 2 can be detected. When a predetermined load acts, the supports 58, 59 abut against each other to support the load and restrain yielding of the coil springs 55 as shown in FIG. 15.

The output of the load cell 51 is sent to an alarm section (not shown) via a cable 15, and the alarm section issues a roll-over alarm on the basis of a load detecting value of the outrigger 2 from the load cell 51.

The load cell 51 is configured in the float shape and can be mounted on the outrigger cylinder 12 as a substitute for a conventional float simply by inserting the pin 64 in the pin hole 61 of the upper load cell case 56, which further facilitates mounting.

Figure 17:
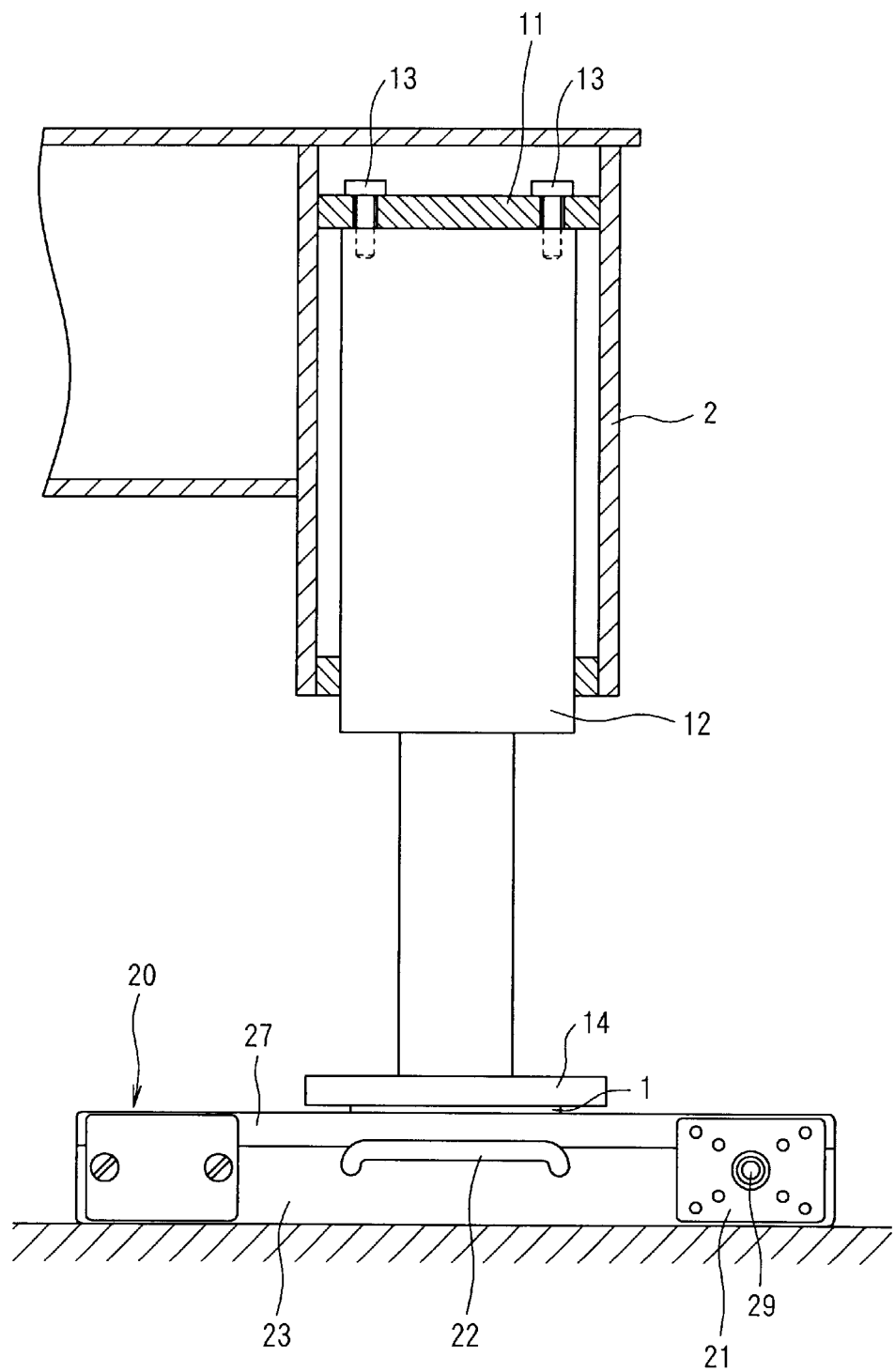
FIG. 17 is a front elevational view of a roll-over alarming device for a crane of yet another embodiment of the present invention in a condition where it is used.
Figure 18:
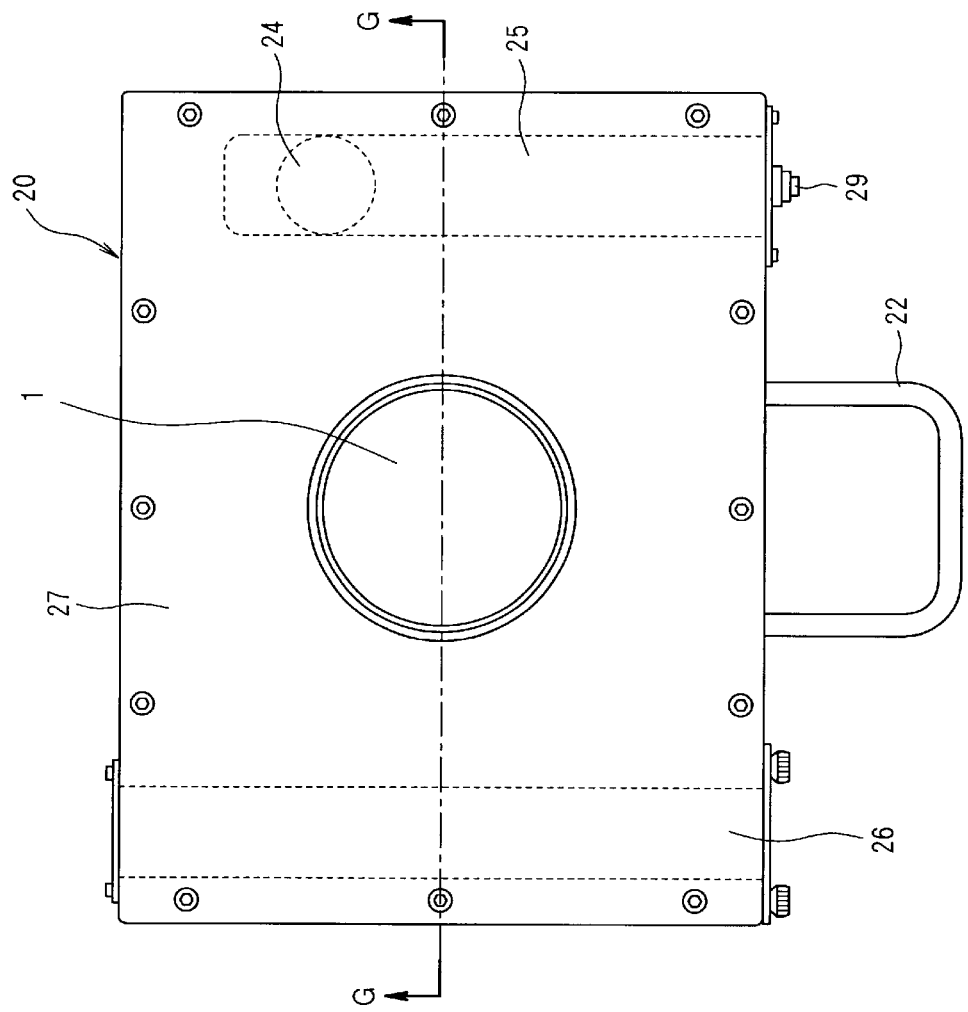
FIG. 18 is a plan view of the roll-over alarming device for the crane.
Figure 19:
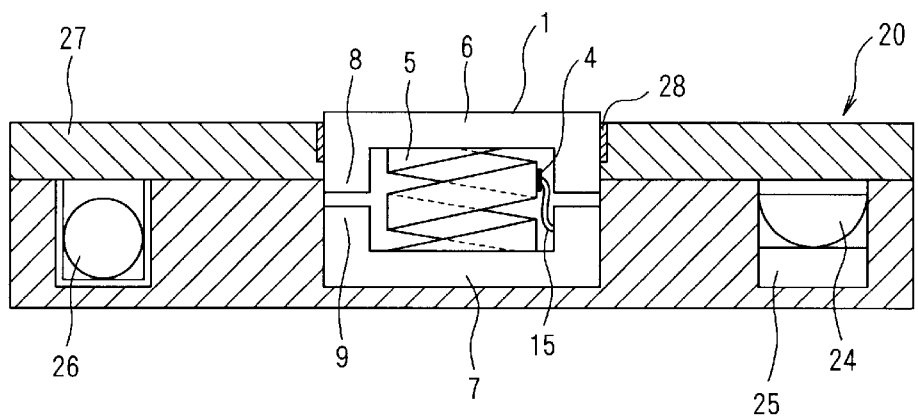
FIG. 19 is a sectional view on line G—G in FIG. 18.
Figure 20:
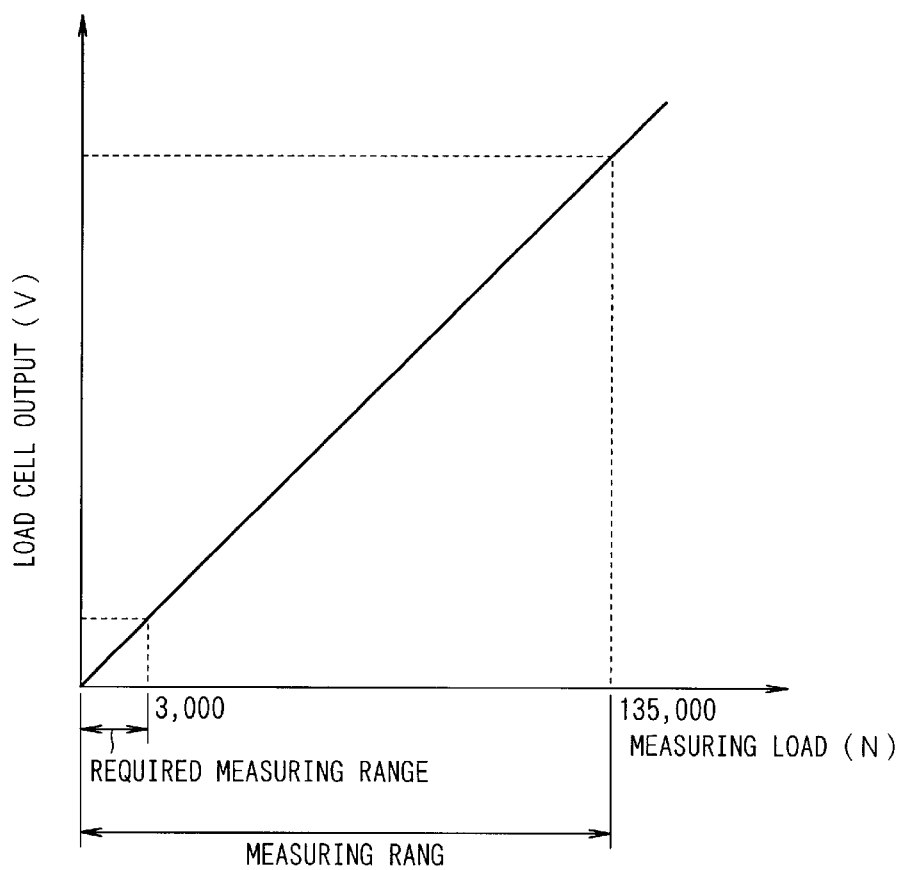
FIG. 20 is a graphical representation of a load measuring range of a conventional load cell.

FIG. 17 is a front elevational view of a roll-over alarming device for a crane of yet another embodiment of the present invention in a condition where it is used, FIG. 18 is a plan view of the roll-over alarming device for the crane, and FIG. 19 is a sectional view on line G—G in FIG. 18.

The roll-over alarming device 20 comprises a load cell 1 and an alarm section 21 integrally formed.

That is, a load cell 1 identical to the one in FIGS. 1 to 4 is disposed in the center of a portable box 23 with a grip 22 on the front surface, the alarm section 21 having a buzzer 24 and control section 25 is disposed on the right side, a battery 26 is disposed as a power source on the left side, and a top surface of the box 23 is covered with a soleplate 27 in such a manner that an upper load cell case 6 only of the load cell 1 projects. A dust seal 28 is provided between the soleplate 27 and the upper load cell case 6. Provided on the front surface of the alarm section 21 is a second switch 29 for manually breaking a self-holding circuit of the power when the operation is finished.

When disposed under the float 14 of the outrigger 2 as shown in FIG. 17 to extend the outrigger cylinder 12, the roll-over alarming device 20 takes the load of the outrigger 2 and thereby operates identically to the one shown in FIGS. 1 to 4.

Therefore, the roll-over alarming device 20 may be disposed under the outrigger cylinder 12 before a start of the crane operation and housed in a housing place when the crane operation is finished, and is not incorporated in the outrigger 2 itself, and thereby can be applied to all the cranes with general versatility.

When the crane operation is carried out on a soft ground, an iron plate or the like is laid under the outrigger 2 to extend a grounding area so as to prevent falling in of the outrigger 2. The roll-over alarming device 20 may be used as a substitute for the iron plate in such a case. Even when the ground is not soft, stability is increased by using the roll-over alarming device 20.

The load cell 1 and alarm section 21 of the roll-over alarming device 20 can be divided and separately disposed, a radio transmitter (not shown) for transmitting a load detecting signal is provided on the load cell 1 side, and a radio receiver (not shown) for receiving the load detecting signal is provided on the alarm section 21 side to issue an alarm at, for example, an operation section of the crane, thus an operator can recognize the roll-over alarm more reliably in a remote control type crane which is operated by the operator apart form the outrigger 2. The operation of the crane may be automatically stopped before roll-over.

As described above, the load cell according to the present invention has a large load capacity and high detection accuracy of the low load and is inexpensive. Further, the roll-over alarming device for the crane according to the present invention can be manufactured at a low cost and issue the roll-over alarm with high accuracy, thereby improving safety.

The load cell is provided in the outrigger cylinder of the crane so as to vertically move the predetermined distance, and the upper load cell case is mounted on the outer box of the outrigger via the pin, which facilitates mounting of the load cell.

The load cell is configured in the float shape, and the upper load cell case is mounted on the outrigger cylinder via the pin, thus the load cell may be mounted as the substitute for the conventional float, which further facilitates mounting of the load cell.

The roll-over alarming device for the crane, wherein the load cell is configured in such a manner that the load cell integral with the alarming section can be disposed under the float of the outrigger, and the roll-over alarm is issued on the basis of the load detecting value of the load cell, may be disposed under the outrigger cylinder before the start of the crane operation and housed in the housing place when the crane operation is finished, and is not incorporated in the outrigger itself, and thereby can be applied to all the cranes with general versatility.

The load cell and alarming section of the roll-over alarming device can be separately disposed, and the radio transmitter for transmitting the load detecting signal is provided on the load cell side and the radio receiver for receiving the load detecting signal is provided on the alarming section side, thus the operator can recognize the roll-over alarm more reliably in the crane which is operated by the operator apart from the outrigger.

What is claimed is:

1. A roll-over alarming device for a crane, using a load cell, comprising:

a coil spring provided with a strain gauge; and an upper load cell case and a lower load cell case which support the coil spring from its top and bottom to transfer a load of an outrigger to the coil spring, wherein supports, which support the load to restrain yielding of the coil spring when the load having more than a predetermined value acts to restrain yielding of the coil spring are provided between the upper load cell case and the lower load cell case.

2. The roll-over alarming device for a crane, according to claim 1, wherein the load cell is mounted on the outrigger of the crane so as to issue a roll-over alarm on the basis of a load detecting value of the load cell.

3. The roll-over alarming device for a crane according to claim 2, wherein the load cell is provided in an outrigger cylinder of the crane so as to vertically move a predetermined distance, and the upper load cell case is mounted on an outer box of the outrigger with a pin.

4. The roll-over alarming device for a crane according to claim 2, wherein the load cell is configured in a float shape, and the upper load cell case is mounted on an outrigger cylinder with a pin.

5. The roll-over alarming device for a crane, according to claim 1, wherein the load cell is configured in such a manner that the load cell integrally formed with an alarming section can be disposed under a float of the outrigger, and the roll-over alarm is issued on the basis of a load detecting value of the load cell.

6. The roll-over alarming device for a crane, according to claim 5, wherein the load cell and the alarming section can be separately disposed, and a radio transmitter for transmitting a load detecting signal is provided on the load cell side, and a radio receiver for receiving the load detecting signal is provided on the alarming section side.

* * * * *